(12) United States Patent
Niemi et al.

(10) Patent No.: US 12,015,594 B2
(45) Date of Patent: *Jun. 18, 2024

(54) POLICY INTEGRATION FOR CLOUD-BASED EXPLICIT PROXY

(71) Applicant: Forcepoint LLC, Austin, TX (US)

(72) Inventors: Olli-Pekka Niemi, Helsinki (FI); Ville K. Mattila, Helsinki (FI)

(73) Assignee: FORCEPOINT LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,603

(22) Filed: Mar. 3, 2021

(65) Prior Publication Data

US 2022/0103526 A1    Mar. 31, 2022

Related U.S. Application Data

(63) Continuation-in-part of application No. 17/033,083, filed on Sep. 25, 2020, now Pat. No. 11,622,024.

(51) Int. Cl.
*H04L 9/40* (2022.01)
*H04L 41/0806* (2022.01)
*H04L 61/4511* (2022.01)
*H04L 67/10* (2022.01)
*H04L 67/568* (2022.01)

(52) U.S. Cl.
CPC ...... *H04L 63/0281* (2013.01); *H04L 41/0806* (2013.01); *H04L 61/4511* (2022.05); *H04L 63/0263* (2013.01); *H04L 67/10* (2013.01); *H04L 67/568* (2022.05)

(58) Field of Classification Search
CPC ............ H04L 41/0806; H04L 61/1511; H04L 63/0281; H04L 67/10; H04L 67/2842
See application file for complete search history.

(56) References Cited

U.S. PATENT DOCUMENTS

| | | | |
|---|---|---|---|
| 7,698,416 B2 | 4/2010 | Potti et al. | |
| 8,090,839 B2 | 1/2012 | Kumar et al. | |
| 8,230,484 B1* | 7/2012 | Wiese | H04L 63/104 |
| | | | 726/28 |
| 8,473,620 B2 | 6/2013 | Demmer et al. | |
| 8,799,403 B2 | 8/2014 | Chan et al. | |
| 8,938,553 B2 | 1/2015 | Ly et al. | |
| 9,065,800 B2 | 6/2015 | Devarajan et al. | |
| 9,531,758 B2 | 12/2016 | Devarajan et al. | |
| 10,425,507 B2 | 9/2019 | Ponec et al. | |
| 2013/0103834 A1* | 4/2013 | Dzerve | H04L 67/10 |
| | | | 709/225 |

(Continued)

*Primary Examiner* — Gil H. Lee
(74) *Attorney, Agent, or Firm* — Jackson Walker LLP; Christopher J. Rourk

(57) ABSTRACT

A system for processing data that includes a first processor configured to operate one or more algorithms to provide a proxy for each of a plurality of external network communications segments and internal network communications segments associated with a specific use, the first processor configured to operate one or more algorithms to provide a firewall agent that performs firewall processing for each of the plurality of external network communications segments and the internal network communications segments and wherein the explicit proxy is installed using a proxy auto configuration file that is associated with the firewall agent.

20 Claims, 4 Drawing Sheets

(56) References Cited

U.S. PATENT DOCUMENTS

| | | | |
|---|---|---|---|
| 2014/0189057 A1* | 7/2014 | Sankoda | H04L 67/10 |
| | | | 709/217 |
| 2016/0088049 A1 | 3/2016 | Seed et al. | |
| 2018/0046487 A1* | 2/2018 | Matters | G06F 9/45558 |
| 2018/0227390 A1 | 8/2018 | Reznik et al. | |
| 2019/0020723 A1* | 1/2019 | Kumar | H04L 63/0281 |
| 2021/0136170 A1* | 5/2021 | Katre | H04L 41/16 |

* cited by examiner

POLICY INTEGRATION FOR CLOUD-BASED EXPLICIT PROXY

RELATED CASES

The present application is a continuation-in-part of U.S. Ser. No. 17/033,083, entitled CLOUD-BASED EXPLICIT PROXY, which is hereby incorporated by reference for all purposes as if set forth herein in its entirety.

TECHNICAL FIELD

The present disclosure relates generally to security services systems such as firewall systems, intrusion detection and prevention and/or application control, and more specifically to a system and method for policy integration for a cloud-based explicit proxy for providing firewall services to users that provides a shareable view between Internet facing firewall policies and private access firewall policies.

BACKGROUND OF THE INVENTION

A firewall typically requires a user to be on a protected network, and firewall services for public network-connected users must typically be local.

SUMMARY OF THE INVENTION

A system for processing data is provided that includes a first processor, such as a server in a group of servers, that is configured to operate one or more algorithms to provide a proxy for each of a plurality of external network communications segments and internal network communications segments associated with a specific user. The first processor, which can include a different server in the group of servers, is further configured to operate one or more algorithms to provide a firewall agent that performs firewall processing for each of the plurality of external network communications segments and the internal network communications segments. The explicit proxy can be installed using a proxy auto configuration file that is associated with the firewall agent, and can be installed automatically on-demand by cloud platform installation tools or in other suitable manners.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
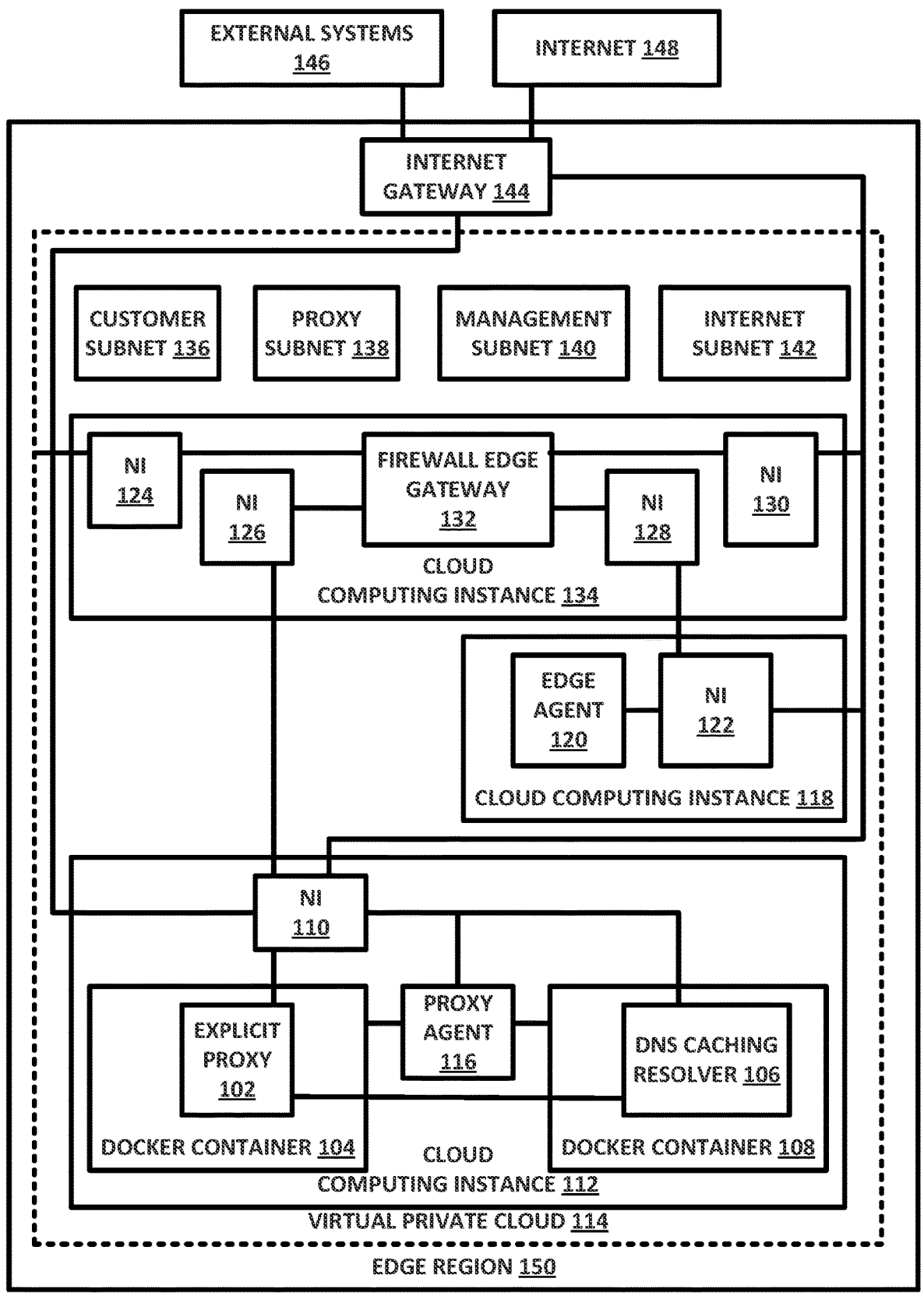
FIG. 1 is a diagram of a system for providing a cloud-based explicit proxy for firewall services, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

As more computer services transition to a cloud-based platform, where the servers that support an individual user are dynamically assigned and instantiated, providing edge protection is more difficult to accomplish. Unless the edge protection is provided by the cloud services provider, it cannot be implemented using a physical device that isolates the user's network from the public network. Even if network security services such as firewall services are provided by the cloud computing service, the consumer of the cloud computing service must accept the firewall service offering and may have limited control over those firewall services.

The present disclosure provides a Dynamic Edge Protection (DEP) cloud based platform that enables the protection of a user's end point device, which can be connected to a public network at any suitable location, such as to allow a roaming user to receive firewall protected data traffic, and not just those end point devices that are based at a protected static location, such as on a protected network at a company headquarters that is protected by a physical firewall.

To provide the disclosed features, a DEP explicit proxy and DNS cache resolver are disclosed that are configured to work in coordination with the existing firewall services of an enterprise that may already be in use at a protected network. For an explicit proxy deployment, a client computer is configured to use a specific proxy server, such as by changing the web browser client and by accordingly configuring the proxy server.

A proxy server that operates in a cloud-based implementation, such as one that runs on Amazon Web Services (AWS) or other suitable cloud hosted systems, can be used to enable an end point device to send network traffic to the explicit proxy, such as by using a proxy auto-configuration (PAC) file or in other suitable manners. A PAC file can be configured to identify a host name that is specific to an enterprise, such as mycompany.proxy.firewallprovider.com:8080, so that the explicit proxy will forward traffic to the security service or firewall provider, such as a next generation firewall (NGFW) or other suitable firewall systems.

The explicit proxy can be written in the programming language Golang or other suitable programming languages, and can be hosted within a suitable software container, such as a versioned Docker container or other suitable containers, a virtual machine, on a server or in other suitable manners. The container can then be stored in a suitable registry, such as the AWS Elastic Container Registry (ECR) or other suitable registries. The container can also be built and pushed to the ECR or other suitable registry using a continuous integration/continuous delivery (CI/CD) pipeline (pipeline as code) or in other suitable manners.

The DNS cache resolver can include a temporary database of recent queries to the explicit proxy, to provide a faster response to a DNS query. The DNS cache resolver can also be hosted within a container, such as a Docker container or other suitable container, and can be pushed to registry using shared CI/CD pipeline code or in other suitable manners. In one example embodiment, the same Docker pipeline code can be used for provisioning the explicit proxy Docker container as well as the DNS cache resolver.

The explicit proxy Docker container, virtual machine, server or other suitable component can be stored in a registrar such as the ECR, to be readily available for provisioning for a new user of DEP or in other suitable manners. In one example embodiment, a versioned explicit proxy Docker container can be stored and provisioned multiple times, depending on specific end-user requirements, or other suitable systems or components can also or alternatively be used. One versioned explicit proxy Docker container can be stored and provisioned multiple times, depending on specific end-user requirements.

The explicit proxy and DNS cache resolver docker containers can be executed using a suitable cloud computing platform, such as an AWS Elastic Compute Cloud (EC2) instance or in other suitable manners. The explicit proxy and DNS cache resolver docker containers can be further configured to operate in conjunction with a next generation firewall instance that operates on the same cloud computing platform, within a virtual private cloud such as an AWS Virtual Private Cloud (VPC), or in other suitable manners.

The PAC file can be generated by a DEP PAC file service, by a managed endpoint application or in other suitable manners. A PAC file download URL can be made available through a DEP customer portal user interface, such as when a customer is "on boarded" or configured to use the DEP services.

Once the PAC file is downloaded via the download URL or in other suitable manners to an end point device, it can be determined whether the end point device is also running firewall system end point device software, such as an agent or thin client, and whether it has a valid security key that is used to authenticate the end point device with the explicit proxy. For example, the security key can be a key that is used by a firewall system to validate a user (a firewall key), a key that is used by an access control system to validate a user (an access key) or other suitable keys. If the end point device satisfies the security requirements, it is configured and allowed to send data traffic to a cloud hosted explicit proxy server.

The data can be complemented with metadata, such as to communicate process information, software versions, operating system security status, patch level information or other suitable data. The explicit proxy can be configured to pass this information to the security system, such as the firewall system, which can then use this information to process policy decisions. The cloud hosted explicit proxy server can be instantiated for the end point device, and can forward the data traffic to a cloud hosted DEP firewall, such as a next generation firewall (NGFW) or other suitable systems.

A roaming user with an end point device that is authorized to interconnect with the cloud processor firewall system can download and install the PAC file, after which it can send traffic to the cloud-based explicit proxy and firewall.

The explicit proxy can be configured to send User Principal Name (UPN) traffic to the firewall or security service, such as by attaching the UPN as metadata to traffic sent to the firewall service, to enable the firewall or security service provider to generate data traffic reports that include the user identity. This feature can be used to provide dynamic user protection features and user-based policy features.

In another embodiment, a CI/CD pipeline can be used to build, version and store an AWS ECR, in order to make the explicit proxy available to be provisioned as needed for a customer. In this manner, the explicit proxy can be used with a cloud-based firewall service or other backend services hosted on a cloud-based processing platform.

An explicit proxy agent can be provided using Python or in other suitable manners. The explicit proxy agent can be configured to use suitable operating commands, such as AWS System Manager (SSM) commands, to cause the Docker containers to be pulled from AWS ECR and provisioned on the explicit proxy cloud computing instance. The explicit proxy can then start the services using an automated process which is run during the on-boarding of a DEP customer.

Container-based services can then be provisioned, such as Docker hosted services, on the cloud computing instance. This provisioning can also be implemented using an automated process. A DNS hostname can then be generated and stored in the cloud processing platform DNS, such as the AWS Route 53 service or other suitable services. The host name can be assigned the IP address of the explicit proxy instance.

A failover security service such as a firewall and explicit proxy can be provisioned using the cloud DNS routing policies. In this manner, if an explicit proxy is unresponsive, an end point device can automatically send traffic to an explicit proxy provisioned in a different cloud platform region. This process can be achieved by having a duplicate DNS host-name assigned the IP address of the failover explicit proxy.

The hostname can be written to the PAC file using an automated PAC file service or in other suitable manners. The PAC file download URL can then be made available to users through a DEP customer portal after they have logged onto the system. The orchestration of the explicit proxy feature with other cloud features increases the strength of protection.

In another example embodiment, docker containers can be run as services on an AWS EC2 instance. A DNS Cache Resolver can be provisioned in compliance with a Forcepoint NGFW (multi-region, multi-NGFW EProxy provisioning) using Python EProxy Agents. The provisioning of Route53 DNS records can allow for traffic to be sent to an EProxy Instance (cater for fail-over) and the PAC file generation per customer, having had this achieved via an automated process ran in AWS (an AWS State Machine/Step Function). Likewise, other suitable embodiments and variations can also or alternatively be used.

In addition, a system and method for policy integration for a cloud-based explicit proxy are disclosed that can be used to provide firewall services to users, and which can also provide a shareable view between Internet facing firewall policies and private access firewall policies. In one example embodiment, an internal application-facing policy from a data center can be used to access the explicit proxy infrastructure through the firewall edge gateway, or other suitable processes can also or alternatively be used.

A policy model can support different points of access. For example, access from an on-premises user to mediated Internet resources can be provided using a hybrid tunnel to a firewall protected cloud environment. In another example embodiment, access can be provided for a roaming user to a mediated Internet resource using the explicit proxy in a firewall protected cloud environment. In a third example, access can be provided to an on-premises user to a mediated private resource using a hybrid tunnel to a firewall protected cloud environment. In a fourth example, access can be provided to a roaming user to a mediated private resource using the explicit proxy in a firewall-protected cloud environment.

One aspect of the present disclosure is a system and method that provides the ability to manage each of these four access methods as well as others, using a common policy, rather than having a separate policy for each mode of access. The present disclosure allows the administrator to simplify the policy creation and management, and to focus on aspects such as user community or risk level, while still allowing for specific access rules if the specific type of access point is important for the application use case. A user operating on-premises can have the same policy view applied to them when they are roaming, which provides for a consistent user experience and which avoids problems that can arise when resources that are available when working on-premises are not accessible when roaming.

In one example embodiment, the present disclosure can be used with zero trust network access (ZTNA), which is a security paradigm that can combine strict identity verification and explicit permission for every person or entity attempting to access or use network resources, regardless of whether the person or entity is in "inside" the enterprise's network perimeter or accessing that network remotely. ZTNA can be implemented using a framework that are used to identify who is trying to access or use data and whether they have explicit permission to do so, such as with a "never trust, always verify" process, as opposed to processes that use a "trust but verify" process.

One advantage of the disclosed ZTNA process is that it can provide protection from both external and internal threats, instead of only protecting against external threats and treating internal data traffic as trusted. The ZTNA process protects against security threats from within, whether explicitly by employees or by malicious actors who have infiltrated the network through email, browsers, VPN connections, and other means. Because data exfiltration can be readily accomplished once access to the enterprise network has been obtained, the disclosed ZTNA process can be used to restrict access from any user until the user's identity can be verified, and then users are monitored to revoke permissions to copy data if user activity meets predetermined criteria for qualifying as suspicious.

In order to implement a ZTNA process, the present disclosure includes the use of least-privilege access to limit access to information for each user to only the data that each user needs. In one example embodiment, each user can be required to access both enterprise network resources and external (public network) resources using a proxy, to prevent a malicious actor from accessing data for other systems by obtaining access to the user's enterprise network login and user identifier, or in other manners. The use of separate proxy access for systems allows each system to be segmented, to divide up an enterprise network into separate segments with different access credentials, which prevents malicious actors from obtaining access to multiple segments of the enterprise network from a breach of one segment.

By configuring access to segments from proxies, the use of each segment can be monitored by a next generation firewall regardless of whether the access is from an internal enterprise network user to other internal enterprise network resources or from an external user. This process allows security and firewall data monitoring, advanced data protection services, such as Deep Packet Inspection (DPI), Anti-virus (AV), advanced malicious detection (AMD) and other suitable services to develop statistics based on how individual users interact with data and enterprise network systems, to help verify the identity of users and to implement risk-adaptive security controls to automatically tailor enforcement based on user activity.

FIG. 1 is a diagram of a system 100 for providing a cloud-based explicit proxy for firewall services, in accordance with an example embodiment of the present disclosure. System 100 includes explicit proxy 102, docker container 104, DNS caching resolver 106, docker container 108, network interface 110, cloud computing instance 112, virtual private cloud 114, proxy agent 116, cloud computing instance 118, edge agent 120, network interfaces 122-130, firewall edge gateway 132, cloud computing instance 134, customer subnet 136, proxy subnet 138, management subnet 140, Internet subnet 142, Internet gateway 144, external systems 146, Internet 148 and edge region 150, each of which can be implemented in hardware or a suitable combination of hardware and software.

Explicit proxy 102 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use explicit proxy 102 to obtain firewall services that would otherwise need to be provided from the user device or from a server that controls access to a public network such as the Internet for the user device. Explicit proxy 102 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality as discussed further herein, or for other suitable purposes.

Docker container 104 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use docker container 104 to obtain firewall services that would otherwise need to be provided from the user device or from a server that controls access to a public network such as the Internet for the user device. Docker container 104 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality as discussed further herein, or for other suitable purposes.

DNS caching resolver 106 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use DNS caching resolver 106 to obtain firewall services that would otherwise need to be provided from the user device or from a server that controls access to a public network such as the Internet for the user device. DNS caching resolver 106 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality as discussed further herein, or for other suitable purposes. DNS caching resolver 106 is configured to receive and process a DNS query from explicit proxy 102, and to interact with network interface 110.

Docker container 108 is configured in a manner similar to docker container 104, and is further configured to support DNS caching resolver 106, as discussed further herein, as well as other suitable functions.

Network interface 110 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use network interface 110 to obtain firewall services that would otherwise need to be provided from the user device or from a server that controls access to a public network such as the Internet for the user device. Network interface 110 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Network interface 110 is configured to receive and process proxy data messages from Internet gateway 144, data messages with a firewall header from network interface 126, configuration data messages from network interface 122 and Internet gateway 144, logs, health monitoring and DNS query data messages from Internet gateway 144, explicit proxy data messages from explicit proxy 102 and DNS caching resolver data messages from DNS caching resolver 106, as discussed further herein, as well as to provide other suitable functions.

Cloud computing instance 112 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use cloud computing instance 112 to obtain firewall services that would otherwise need to be provided from the user device or from a server that controls access to a public network such as the Internet for the user device. Cloud computing instance 112 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Cloud computing instance 112 is configured to host explicit proxy 102, docker container 104, DNS caching resolver 106, docker container 108, network interface 110 and proxy agent 116, including associated data processing, memory and messaging, as discussed further herein, as well as other to provide suitable functions.

Virtual private cloud 114 be implemented as one or more algorithms that operate in conjunction with a processor and associated memory devices to cause the processor to perform functions associated with supporting public network access through a firewall for a device that is coupled to a public network, as discussed further herein, as well as other suitable processes supported by a virtual private cloud, such as data processing, messaging and data storage. In one example embodiment, a user device can access a virtual enterprise network, such as edge region 150 or other suitable enterprise networks, and can use virtual private cloud 114 to obtain firewall services that would otherwise need to be provided from the user device or from a server that controls access to a public network such as the Internet for the user device. Virtual private cloud 114 one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Virtual private cloud 114 is configured to support cloud computing instances 110, 118 and 134 and their associated components, as well as customer subnet 136, proxy subnet 138, management subnet 140 and Internet subnet 142, as discussed further herein, as well as to provide other suitable functions.

Proxy agent 116 be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use proxy agent 116 to obtain firewall services that would otherwise need to be provided from the user device or from a server that controls access to a public network such as the Internet for the user device. Proxy agent 116 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Proxy agent 116 is configured to receive and process proxy data messages from docker container 104, docker container 108 and network interface 110, as discussed further herein, as well as to provide other suitable functions.

Cloud computing instance 118 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use cloud computing instance 118 to obtain firewall services that would otherwise need to be provided from the user device or from a server that controls access to a public network such as the Internet for the user device. Cloud computing instance 118 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Cloud computing instance 118 is configured to host edge agent 120 and network interface 122, including associated data processing, memory and messaging, as discussed further herein, as well as other to provide suitable functions.

Edge agent 120 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use edge agent 120 to obtain firewall services that would otherwise need to be provided from the user device or from a server that controls access to a public network such as the Internet for the user device. Edge agent 120 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Edge agent 120 is configured to use network interface 122 to provide edge gateway configuration data to network interface 128, as discussed further herein, as well as other to provide suitable functions.

Network interfaces 122-130 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use network interfaces 122-130 to obtain firewall services that would otherwise need to be provided from the user device or from a server that controls access to a public network such as the Internet for the user device. Network interfaces 122-130 are components of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Network interfaces 122-130 are configured to provide tunnel data traffic to firewall edge gateway 132, to provide traffic with a firewall header to firewall edge gateway 132, to provide edge gateway configuration data to firewall edge gateway 132 and to provide logs/health monitoring and DNS queries to Internet gateway 144, as discussed further herein, as well as other to provide suitable functions.

Firewall edge gateway 132 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use firewall edge gateway 132 to obtain firewall services that would otherwise need to be provided from the user device or from a server that controls access to a public network such as the Internet for the user device. Firewall edge gateway 132 is a component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Firewall edge gateway 132 is configured to receive tunnel data traffic from network interface 124, to receive traffic with a firewall header from network interface 126, to receive edge gateway configuration data from network interface 128 and to provide logs/health monitoring and DNS queries to network interface 130, as discussed further herein, as well as other to provide suitable functions.

Cloud computing instance 134 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use cloud computing instance 134 to obtain firewall services that would otherwise need to be provided from the user device or from a server that controls access to a public network such as the Internet for the user device. Cloud computing instance 134 is a component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Cloud computing instance 134 is configured to host network interfaces 124-130 and edge gateway 132, including associated data processing, memory and messaging, as discussed further herein, as well as other to provide suitable functions.

Customer subnet 136, proxy subnet 138, management subnet 140 and Internet subnet 142 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and customer subnet 136, proxy subnet 138, management subnet 140 and Internet subnet 142 can be used to support and provide firewall services that would otherwise need to be supported and provided from the user device or from a server that controls access to a public network, such as the Internet for the user device. Customer subnet 136, proxy subnet 138, management subnet 140 and Internet subnet 142 are components of a system that work in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes.

Internet gateway 144, external systems 146 and Internet 148 provide access to a public network and public network functions, such as to allow unregulated entities to provide data and services to users. Because many of these data and services are provided by unregulated entities, they can be used to launch malicious attacks on the user devices, the network components and other systems and devices. In addition, end point devices are included in the external systems 146, and access the components of system 100 behind Internet gateway 144 using a PAC file that can be obtained from a PAC file service, or in other suitable manners. As discussed further herein, the PAC file can be generated by a DEP PAC file service and a PAC file download URL can be made available using a DEP customer portal user interface, such as when a customer is "on boarded" onto the DEP service, as discussed further herein, or other suitable processes can also or alternatively be used. The PAC file is run on the end point device, such as by downloading the PAC file to the end point device by executing the PAC file download URL or in other suitable manners. When the PAC file is executed, it configures the end point device, such as by defining how web browsers and other user agents can automatically choose the appropriate proxy server for fetching a given URL. The PAC file can contain a suitable JavaScript function, such as FindProxyForURL, that returns a string with one or more access method specifications. In addition, a firewall system agent can be implemented on the end point, and can include one or more security devices such as a security key that are used to ensure that the end point and the user of the end point are authorized users. In this manner, the use of the explicit proxy by the end point can be coordinated with the firewall system, and the end point device can be prevented from accessing systems over the public network unless the access is controlled by the firewall.

In operation, system 100 allows a user device that is coupled to a public network such as the Internet to be protected, by providing an integrated suite of docker containers, explicit proxies and other suitable system components that prevent the user device from accessing the public network directly, and which ensure that public network data traffic is protected by a firewall system that can be modified and adapted to provide new or different functionality without the need to install new functionality on the user device.

In this manner, secure firewall protection can be provided even when a user device is not physically connected to a protected network.

Figure 2:
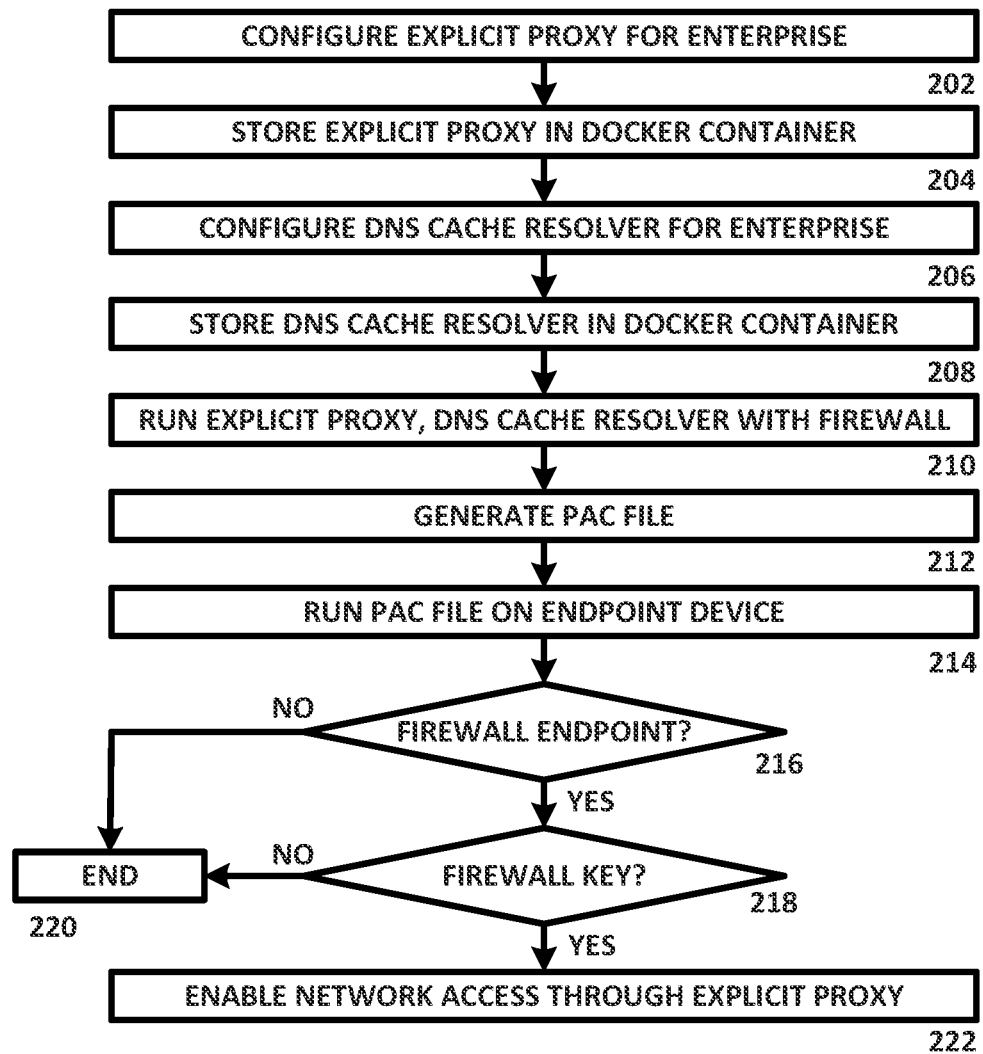
FIG. 2 is an algorithm for providing a cloud-based explicit proxy for firewall services, in accordance with an example embodiment of the present disclosure.

FIG. 2 is an algorithm 200 for providing a cloud-based explicit proxy for firewall services, in accordance with an example embodiment of the present disclosure. Algorithm 200 can be implemented in hardware or a suitable combination of hardware and software.

Algorithm 200 begins at 202, where an explicit proxy is configured for use with an enterprise network. In one example embodiment, the explicit proxy can be configured as discussed further herein, to provide support for enterprise services and policies in conjunction with an enterprise firewall, or in other suitable manners. The algorithm then proceeds to 204.

At 204, the explicit proxy is stored in a docker container. In one example embodiment, the explicit proxy can be stored in a docker container to facilitate distribution and installation of the explicit proxy in a cloud environment, such as part of instantiation of cloud computing instances or in other suitable manners as discussed further herein. The algorithm then proceeds to 206.

At 206, where a DNS cache resolver is configured for use with an enterprise network. In one example embodiment, the DNS cache resolver can be configured as discussed further herein, to provide support for enterprise services and policies in conjunction with an enterprise firewall, or in other suitable manners. The algorithm then proceeds to 208.

At 208, the DNS cache resolver is stored in a docker container. In one example embodiment, the DNS cache resolver can be stored in a docker container to facilitate distribution and installation of the explicit proxy in a cloud environment, such as part of instantiation of cloud computing instances or in other suitable manners as discussed further herein. The algorithm then proceeds to 210.

At 210, the explicit proxy and DNS cache resolver are run in conjunction with a firewall. In one example embodiment, the explicit proxy and DNS cache resolver can be instantiated when needed by an end point device, or in other suitable manners. The algorithm then proceeds to 212.

At 212, a PAC file is generated. In one example embodiment, the PAC file can be generated by a DEP PAC file service and a PAC file download URL can be made available using a DEP customer portal user interface, such as when a customer is "on boarded" onto the DEP service, as discussed further herein, or other suitable processes can also or alternatively be used. The algorithm then proceeds to 214.

At 214, the PAC file is run on the end point device. In one example embodiment, the PAC file can be downloaded to the end point device by executing the PAC file download URL or in other suitable manners. The algorithm then proceeds to 216.

At 216, it is determined whether the end point device is operating a local firewall coordination system, as discussed further herein. If it is determined that the end point device is not operating the local firewall coordination system, the algorithm proceeds to 220 and ends, such as by generating an error message that instructs the user of the end point device to restart the end point device with the local firewall coordination system. Otherwise the algorithm proceeds to 218.

At 218, it is determined whether a key associated with the local firewall coordination system is present. If it is determined that the key is not present, the algorithm proceeds to 220 and ends, otherwise the algorithm proceeds to 222.

At 222, public and private network access is enabled through the explicit proxy. In one example embodiment, access to the public network can be restricted to traffic that is processed using the explicit proxy, or other suitable processes can also or alternatively be used.

In operation, algorithm 200 can be used to provide a cloud-based explicit proxy for firewall services. Although algorithm 200 is shown as a flow chart, one of skill in the art will recognize that the associated algorithmic functions can be implemented using object oriented programming, a ladder diagram, a state diagram, other suitable programming paradigms, a suitable combination of programming paradigms or in other suitable manners.

The present disclosure can be used to provide a system and method for policy integration for a cloud-based explicit proxy, such as to provide firewall services to users. A shareable view can be provided between Internet facing firewall policies and private access firewall policies. An internal application-facing policy from an enterprise data center can be used to access an explicit proxy infrastructure through the firewall edge gateway.

The policy model of the present disclosure can support different points of access. For example, an on-premises user of the enterprise network can be provided with mediated Internet resources, such as by using a hybrid tunnel to the cloud-based firewall. A roaming user can be provided with mediated Internet resource using an explicit proxy in the cloud-based firewall. An on-premises user of an enterprise network can be provided with mediated access to a private resource using a hybrid tunnel to the cloud-based firewall. A roaming user can be provided with mediated access to a private resource using the explicit proxy in the cloud-based firewall. Likewise, other suitable points of access can also or alternatively be provided.

In one embodiment of the present disclosure, the ability to manage different access methods like these is provided using a common policy, rather than having a separate policy for each mode of access. This embodiment allows an administrator to simplify policy creation and management and to focus on specific selected sets of data out of a large body of data to identify aspects such as user community or risk level, while still allowing for specific access rules if the distinction in access point is important for the application use case. In this manner, a user operating a data processing device on-premises to an enterprise network can have the same policy view applied to them when they are roaming.

Figure 3:
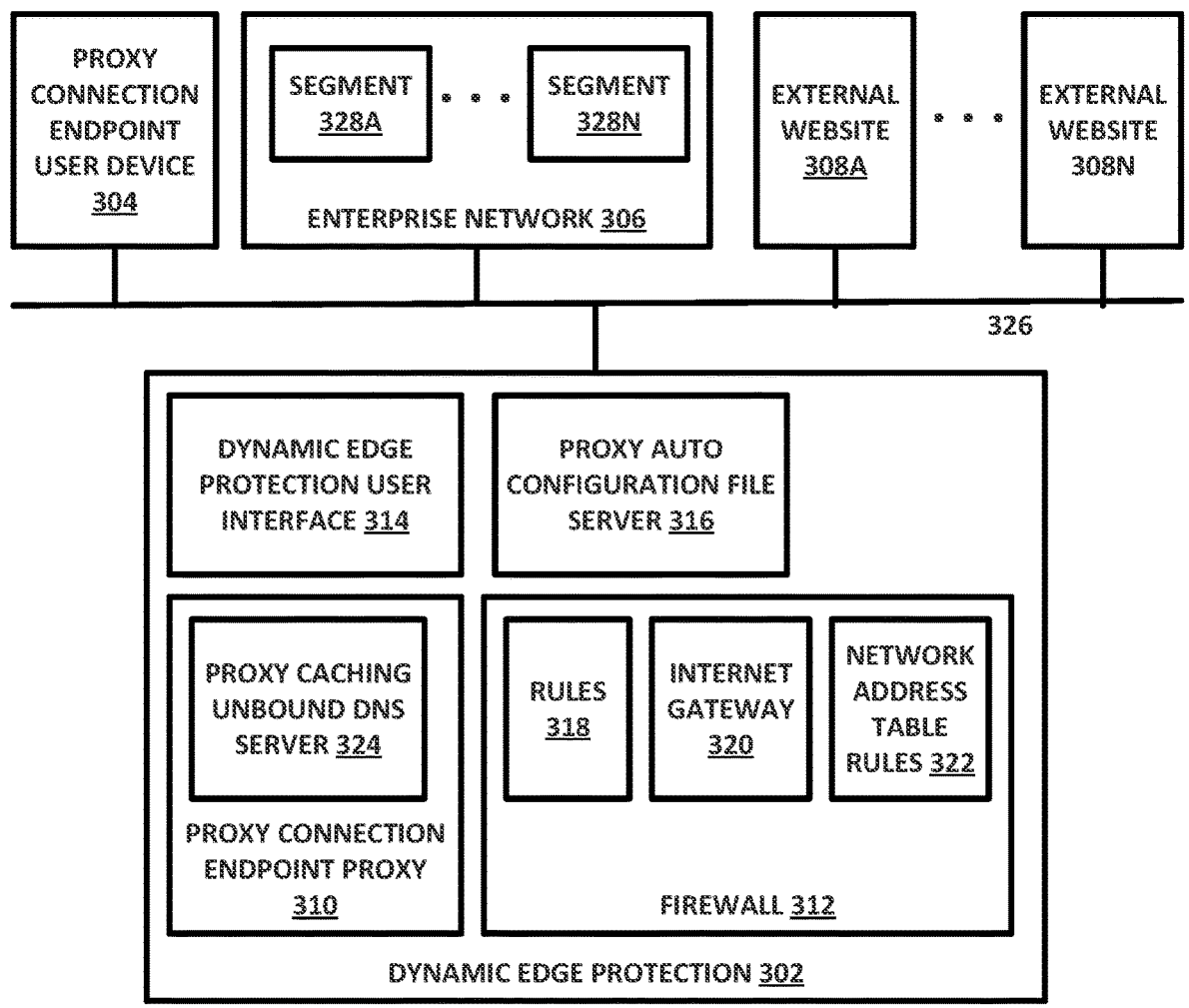
FIG. 3 is a diagram of a system for policy integration for a cloud-based explicit proxy, in accordance with an example embodiment of the present disclosure.

FIG. 3 is a diagram of a system 300 for policy integration for a cloud-based explicit proxy, in accordance with an example embodiment of the present disclosure. System 300 includes dynamic edge protection 302, proxy connection end point user device 304, enterprise network 306, external websites 308A through 308N, proxy connection endpoint proxy 310, firewall 312, dynamic edge protection user interface 314, proxy auto configuration file server 316, rules 318, Internet gateway 320, network address table rules 322, proxy caching unbound DNS server 324, network 326 and segments 328A through 328N, each of which can be implemented in hardware or a suitable combination of hardware and software.

Dynamic edge protection 302 can be implemented as one or more algorithms that are implemented in logic devices or loaded into a data memory device associated with a processor to be loaded into the processor to configure the processor to protection to data processing devices and systems within a network from external threats. In one example embodiment, dynamic edge protection 302 can provide firewall processing that includes policy definition and enforcement, malware scanning and other suitable functions.

Proxy connection end point user device 304 can be implemented as one or more algorithms that are implemented in logic devices or loaded into a data memory device associated with a processor that are loaded into the processor to configure the processor to provide a proxy connection end point for a user of a user device, such as to allow the user to log on to an enterprise network in conjunction with a proxy connection to provide load balancing, privacy, security and other suitable functions. In one example embodiment, proxy connection end point user device 304 can provide a proxy set for an enterprise network and access to enterprise network 306, external websites 308A through 308N and proxy connection endpoint proxy 310 or other suitable functions. Proxy connection end point user device 304 can be configured to enforce predetermined rules, such as to direct request for access to enterprise network 306 segments and external websites 308A through 308N through dynamic edge protection 302, or other suitable functions. Although a single proxy connection end point user device 304 is shown, a plurality of proxy connection end point user devices 304 can be supported by system 300.

Enterprise network 306 can be implemented as one or more algorithms that are implemented in logic devices or loaded into a data memory device associated with a processor to be loaded into the processor to configure the processor to provide enterprise network functions, such as access to enterprise file servers, printers, web servers and other suitable functions. In one example embodiment, enterprise network 306 can allow a user to access resources that are protected from access over a public network, such as network 326, and which utilize a private network to provide connectivity between the resources of enterprise network 306. The individual system components of enterprise network 306 can be separately accessed by a unique proxy, to allow the system components to be segmented and to prevent access from one system component from being used to obtain access to a different system component.

External websites 308A through 308N can be implemented as one or more algorithms that are implemented in logic devices or loaded into a data memory device associated with a processor to be loaded into the processor to configure the processor to provide web services to users over a public network, such as network 326. In one example embodiment, external websites 308A through 308N can include unsecure websites, such as websites that have been infected with malware and which can transmit the malware to a third party that accesses the web site. External websites 308A through 308N can also include websites that provide restricted functions, such as gaming or access to video contact, which are not permitted to be accessed from proxy connection endpoint user device 304, such as where proxy connection endpoint user device 304 is provided to a user and restricted to business use only.

Proxy connection endpoint proxy 310 can be implemented as one or more algorithms that are implemented in logic devices or loaded into a data memory device associated with a processor to be loaded into the processor to configure the processor to provide access to a dynamic edge protection subnet for proxy connection endpoint user device 304 or other suitable devices.

Firewall 312 can be implemented as one or more algorithms that are implemented in logic devices or loaded into a data memory device associated with a processor to be loaded into the processor to configure the processor to provide firewall protection for a dynamic edge protection subnet or other suitable functions.

Dynamic edge protection user interface 314 can be implemented as one or more algorithms that are implemented in logic devices or loaded into a data memory device associated with a processor to be loaded into the processor to configure the processor to configure local domain name system information for use with system 300, such as to identify a site for ZTNA, to ask local routes for ZTNA site and for other suitable purposes.

Proxy auto configuration (PAC) file server 316 can be implemented as one or more algorithms that are implemented in logic devices or loaded into a data memory device associated with a processor to be loaded into the processor to configure the processor to modify a default.pac file so that enterprise network local zones are handled by a specific ZTNA proxy.

Rules 318 can be implemented as one or more algorithms that are implemented in logic devices or loaded into a data memory device associated with a processor to be loaded into the processor to configure the processor to allow dynamic edge protection 302 firewall 312 to allow predetermined traffic to the enterprise network.

Internet gateway 320 can be implemented as one or more algorithms that are implemented in logic devices or loaded into a data memory device associated with a processor to be loaded into the processor to configure the processor to provide a predetermined access point for Internet/public network traffic.

Network address table rules 322 can be implemented as one or more algorithms that are implemented in logic devices or loaded into a data memory device associated with a processor to be loaded into the processor to configure the processor to hide traffic from a front end subnet using a network address table, behind monitoring IP, such as to prevent identification of specific user end points within the private network.

Proxy caching unbound DNS server 324 can be implemented as one or more algorithms that are implemented in logic devices or loaded into a data memory device associated with a processor to be loaded into the processor to configure the processor to associate enterprise network DNS information as one or more local zones.

Network 326 can be implemented as one or more algorithms that are implemented in logic devices or loaded into a data memory device associated with a processor to be loaded into the processor to configure the processor to provide proxy connection end point user device 304 with access to enterprise network 306 and external websites 308A through 308N, using dynamic edge protection 302 or in other suitable manners. Network 326 can be a public network such as the Internet or other suitable networks.

Segments 328A through 328N can be implemented as one or more algorithms that are implemented in logic devices or loaded into a data memory device associated with a processor to be loaded into the processor to configure the processor to provide enterprise network services to users of enterprise network 306. In one example embodiment, enterprise network 306 can be used to support the operations of an enterprise, such as access to individual applications (e.g. word processing applications, data modeling applications, accounting applications and communications applications), access to data associated with applications, access to services such as printing or other peripherals such as network-connected cameras and so forth. Segments 328A through 328N can be used to provide separate user credentials for each user, such as to facilitate the use of proxy access to segments to prevent access to one segment and its associated data and services to be used to access other segments or associated data and services.

In operation, system 300 can provide firewall services to users that provide a shareable view between Internet facing firewall policies and private access firewall policies, or other suitable functions. System 300 allows an administrator to configure the network to eliminate the need for a virtual private network by configuring access to specific network resources for specific users, using a zero trust network access regime. In this manner, network resources that a user does not require access to can remain hidden, to protect them from access by malicious users or from malware exposure.

Figure 4:
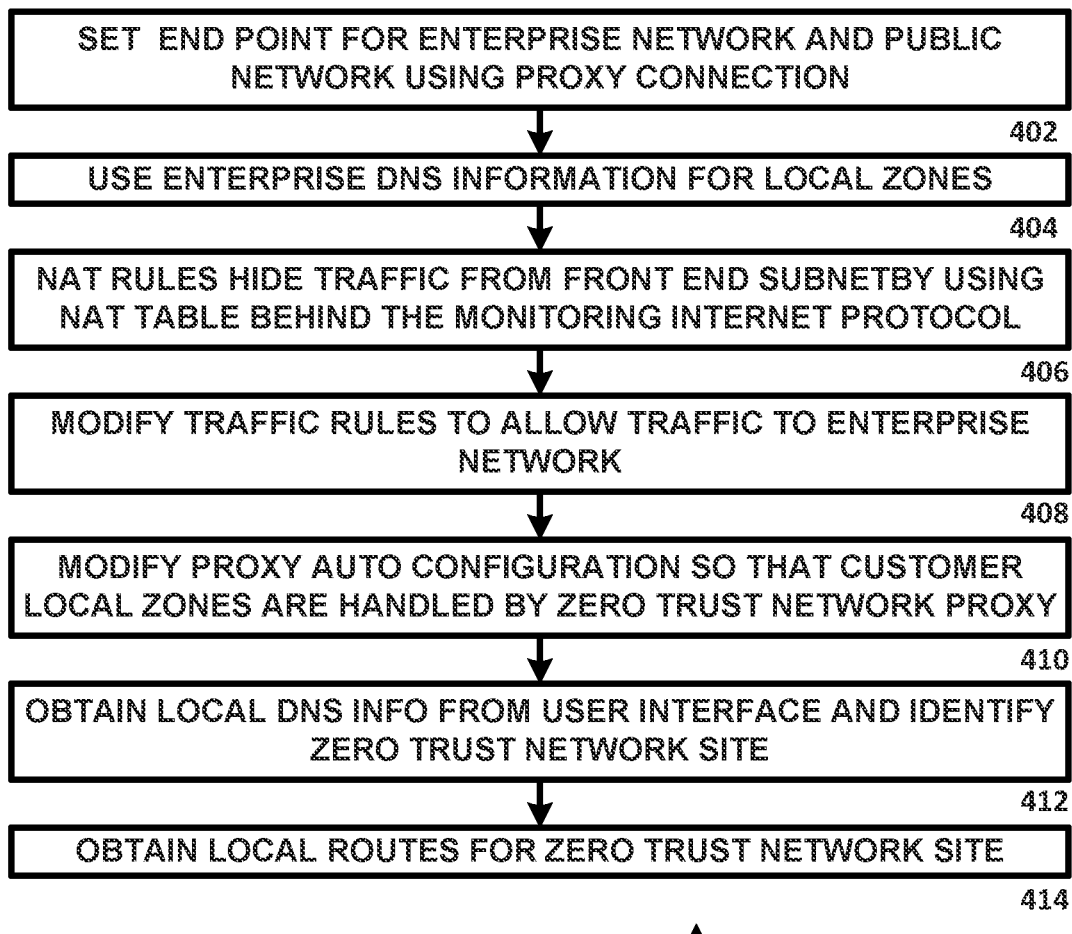
FIG. 4 is a diagram of an algorithm for policy integration for a cloud-based explicit proxy, in accordance with an example embodiment of the present disclosure.

FIG. 4 is a diagram of an algorithm 400 for policy integration for a cloud-based explicit proxy, in accordance with an example embodiment of the present disclosure. Algorithm 400 can be implemented using one or more algorithms operating in hardware or a suitable combination of hardware and software.

Algorithm 400 begins at 402, where a proxy connection end point user device is configured for access to an enterprise networks and Internet access using a proxy connection end point proxy. In one example embodiment, a user interface for a dynamic edge protection system can be generated that identifies the proxy connection end point user device, network resources that should be made available to the proxy connection end point user device and other suitable information, such as by searching through database information for specific network resources associated with a user and by generating a user interface that includes those resources and associated information that is needed by a network administrator to configure the proxy connection end point user device. In this manner, the network administrator does not need to manually search databases to identify resources and associated information, and the user interface can present that information to the network administrator at a main configuration menu. Likewise, other suitable processes and user interfaces can also or alternatively be provided, as disclosed and discussed further herein. The algorithm then proceeds to 404.

At 404, a proxy caching unbound DNS server is configured to use enterprise network DNS information for local zone identification. In one example embodiment, the local zone identification can be used to configure the zero trust network access or for other suitable purposes. The information required to configure the proxy caching unbound DNS server can be automatically identified and a user interface can be generated for use by the network administrator to configure the proxy connection end point user device or for other suitable purposes. The algorithm then proceeds to 406.

At 406, firewall network address table rules are configured to hide traffic from the front end subnet, such as by using the network address table behind the monitoring Internet protocol or in other suitable manners. In one example embodiment, a user interface can be generated that presents the specific firewall network address table rules that need to be configured, the specific network address table, or other suitable data in a format that presents one or more configuration options. The algorithm then proceeds to 408.

At 408, access rules are modified so that traffic to the enterprise network is allowed. In one example embodiment, a user interface can be generated that selects the access rules that need to be modified as a function of the enterprise network, the end point, selected network resources or other suitable information, with associated configuration options to allow the user to modify the access rules from a main menu or in other suitable manners. The algorithm then proceeds to 410.

At 410, a proxy auto configuration file server modifies a default proxy auto configuration file to configure enterprise local zones to be handled by a specific zero trust network access proxy. In one example embodiment, the default proxy auto configuration file can be modified automatically, in conjunction with a user interface that selects the default proxy auto configuration file that requires modification and which identifies allowed modifications, or in other suitable manners. The algorithm then proceeds to 412.

At 412, a dynamic edge protection user interface is used to obtain local DNS information and to mark one or more of the sites as a zero trust network access site. In one example embodiment, the user interface can assemble local DNS information into a control that include an indicator for each site to be marked, and can then store the DNS information in a predetermined cache for future use. The algorithm then proceeds to 414.

At 414, a dynamic edge protection user interface can be used to query local routes for a zero trust network access site. In one example embodiment, the enterprise network DNS information can include local route data that is not otherwise accessible, and the local route data can identify the zero trust network access site or other suitable information. The dynamic edge protection user interface can generate a display with associated user controls to allow modification of the proxy auto configuration file at 410 or other suitable processes. The algorithm then terminates, such as by passing control to a different algorithmic process.

In operation, algorithm 400 can provide firewall services to users that provide a shareable view between Internet facing firewall policies and private access firewall policies, or for other suitable purposes. Although algorithm 400 is shown as a flow chart, one of skill in the art will recognize that it can also or alternatively be implemented using object oriented programming, state diagrams, ladder diagrams, other suitable programming conventions or a suitable combination programming conventions.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for processing data, comprising:
a first processor configured to operate one or more algorithms to provide a proxy server of a separate cloud computing instance for each of a plurality of external network communications segments that are each associated with a specific user and internal network communications segments that are each associated with the specific user;
the first processor configured to operate one or more algorithms to provide a firewall agent that performs firewall processing for each of the plurality of external network communications segments and the internal network communications segments; and
wherein the proxy server is installed using a proxy auto configuration file that is associated with the firewall agent.

2. The system of claim 1 wherein the proxy server is implemented on a cloud processing platform that instantiates the proxy server on demand for the specific user using a docker container of an integrated suite of docker containers that is instantiated on demand.

3. The system of claim 1 wherein the proxy server is implemented on a cloud processing platform that instantiates the proxy server on demand using a first docker container and an associated DNS cache resolver using a second docker container that is instantiated on demand at the server.

4. The system of claim 1 wherein the proxy server is implemented on a cloud processing platform that instantiates the proxy server on demand using a container logic structure.

5. The system of claim 1 wherein the proxy server is implemented on a cloud processing platform that instantiates the proxy server on demand and that separately instantiates an associated DNS cache resolver on demand using separate container logic structures.

6. The system of claim 1 wherein the proxy server is implemented on a cloud processing platform that instantiates the proxy server on demand and that separately instantiates an associated DNS cache resolver on demand using separate docker containers in conjunction with a firewall system operating on the cloud processing platform that uses the proxy server and the DNS cache resolver to provide firewall processing.

7. The system of claim 1 wherein the proxy server comprises an explicit proxy.

8. The system of claim 1 wherein the proxy server comprises an explicit proxy that is instantiated for the user.

9. A method for processing data, comprising:
configuring a first processor to operate one or more algorithms to provide a proxy server of a separate cloud computing instance for each of a plurality of external network communications segments that are each associated with a specific user and internal network communications segments that are each associated with the specific user;
configuring the first processor to operate one or more algorithms to provide a firewall agent that performs firewall processing for each of the plurality of external network communications segments and the internal network communications segments; and
installing the proxy server using a proxy auto configuration file that is associated with the firewall agent.

10. The method of claim 9 further comprising implementing the proxy server on a cloud processing platform that instantiates the proxy server on demand and associates it with one of the plurality of external network communications segments.

11. The method of claim 9 further comprising implementing the proxy server on a cloud processing platform that instantiates the proxy server and an associated DNS cache resolver on demand.

12. The method of claim 9 further comprising implementing the proxy server on a cloud processing platform that instantiates the proxy server on demand using a container logic structure.

13. The method of claim 9 further comprising implementing the proxy server on a cloud processing platform that instantiates the proxy server and an associated DNS cache resolver on demand using container logic structures.

14. The method of claim 9 further comprising implementing the proxy server on a cloud processing platform that instantiates the proxy server and an associated DNS cache resolver on demand in conjunction with a firewall system operating on the cloud processing platform.

15. A system including a processor with associated data memory devices that are configured to store instructions that cause the processor to perform functions associated with the instructions, the instructions causing the processor to perform the functions of:
provide a proxy server of a separate cloud computing instance for each of a plurality of external network communications segments and internal network communications segments associated with one of a corresponding plurality of specific users;
provide a firewall agent that performs firewall processing for each of the plurality of external network communications segments and the internal network communications segments; and
install the proxy server using a proxy auto configuration file that is associated with the firewall agent.

16. The system of claim 15 wherein the instructions cause the processor to implement the proxy server on a cloud processing platform that instantiates the proxy server on demand.

17. The system of claim 15 wherein the instructions cause the processor to implement the proxy server on a cloud processing platform that instantiates the proxy server and an associated DNS cache resolver on demand.

18. The system of claim 15 wherein the instructions cause the processor to implement the proxy server on a cloud processing platform that instantiates the proxy server on demand using a container logic structure selected from a plurality of container logic structures.

19. The system of claim 15 wherein the instructions cause the processor to implement the proxy server on a cloud processing platform that instantiates the proxy server and an associated DNS cache resolver on demand using container logic structures.

20. The system of claim 15 wherein the instructions cause the processor to implement the proxy server on a cloud processing platform that instantiates the proxy server and an associated DNS cache resolver on demand in conjunction with a firewall system operating on the cloud processing platform.

\* \* \* \* \*